(12) United States Patent
Torttila et al.

(10) Patent No.: US 12,325,982 B2
(45) Date of Patent: Jun. 10, 2025

(54) CONSTRUCTION SITE ORCHESTRATION USING DYNAMIC COMPUTER VISION

(71) Applicant: Trimble Inc., Westminster, CO (US)

(72) Inventors: Karoliina Torttila, Helsinki (FI); Jim Coleman, Longmont, CO (US); Robert Banfield, Riverview, FL (US); Vishakaraj Shanmugavel, Denver, CO (US)

(73) Assignee: Trimble Inc., Westminster, CO (US)

( * ) Notice: Subject to any disclaimer, the term of this patent is extended or adjusted under 35 U.S.C. 154(b) by 406 days.

(21) Appl. No.: 17/979,460

(22) Filed: Nov. 2, 2022

(65) Prior Publication Data

US 2024/0141624 A1    May 2, 2024

(51) Int. Cl.
*G06T 7/70* (2017.01)
*E02F 9/20* (2006.01)
(Continued)

(52) U.S. Cl.
CPC .............. *E02F 9/264* (2013.01); *E02F 9/205* (2013.01); *E02F 9/261* (2013.01); *G06V 10/764* (2022.01); *G06V 10/774* (2022.01); *G06V 20/56* (2022.01)

(58) Field of Classification Search
CPC ....... G06T 3/12; G06T 3/4038; G06T 15/205; G06T 2207/30244; G06T 15/20; G06T 2207/30252; G06T 7/70; G06T 2207/10024; G06T 2207/30164; G06T 7/0002; G06T 7/001; G06T 7/20; G06T 7/246; G06T 7/33; G06T 7/55; G06T 7/60; G06T 2207/10004; G06T 2207/10048; G06T 2207/20164; G06T 2207/20221; G06T 5/50; G06T 7/73; B60R 2300/105;
(Continued)

(56) References Cited

U.S. PATENT DOCUMENTS

2019/0048559 A1\* 2/2019 Olsen ..................... B60K 35/60
2021/0040713 A1 2/2021 Yamanaka et al.
(Continued)

FOREIGN PATENT DOCUMENTS

EP     3 985 183 A1    4/2022

OTHER PUBLICATIONS

Extended European Search Report for Application No. 23204799.3-1002, mailed Mar. 21, 2024, 6 pages.

*Primary Examiner* — Quan M Hua
(74) *Attorney, Agent, or Firm* — Kilpatrick Townsend & Stockton LLP

(57) ABSTRACT

Techniques for orchestrating activities at an earthmoving site are described. In an example, a stream of images are captured by an image capturing device removably fixed to a mobile earthmoving machine with a field of view overlapping with a working range of an attachment coupled to the mobile earthmoving machine. Using a selected subset of images from the stream captured during a time period, a first trained algorithm generates a probability that the subset of images depicts an action performable by the machine. Based on the probability, it is determined that the machine was performing the action during the time period, and in response, an image from the subset of images is selected. The image and an indication that the machine was performing the action during the time period are transmitted to a remote server system through a network.

20 Claims, 7 Drawing Sheets

(51) Int. Cl.
*E02F 9/26* (2006.01)
*G06V 10/764* (2022.01)
*G06V 10/774* (2022.01)
*G06V 20/56* (2022.01)

(58) Field of Classification Search
CPC ....... B60R 2300/304; B60R 1/27; B60R 1/26; B60R 2300/207; G06V 20/58; G06V 10/62; G06V 10/751; G06V 2201/034; G06V 10/245; G06V 10/25; G06V 10/761; G06V 20/625; G06V 30/10; B66C 15/00; B66C 13/16
See application file for complete search history.

(56) References Cited

U.S. PATENT DOCUMENTS

| | | | |
|---|---|---|---|
| 2023/0004171 A1* | 1/2023 | Bando | G01S 19/23 |
| 2023/0143733 A1* | 5/2023 | Onishi | E02F 9/262 |
| | | | 701/50 |

* cited by examiner

CONSTRUCTION SITE ORCHESTRATION USING DYNAMIC COMPUTER VISION

BACKGROUND

Heavy equipment, such as excavators, dump trucks, loaders, bulldozers, mixers, and the like typically operate across large geographic regions within earthmoving sites. Some examples of earthmoving sites include, but are not limited to, building/bridge/road construction sites, quarries, and mines. Thus, it may be difficult to efficiently monitor and manage the ongoing activities scheduled to take place throughout the earthmoving site.

SUMMARY

Embodiments provide image capturing methods and systems for monitoring and managing productivity at an earthmoving site using computer vision to track actions and events performed by heavy equipment across the earthmoving site. Image capturing devices can be removably fixed to mobile earthmoving machines to capture streams of images from the perspective of the earthmoving machine, including a portion of the earthmoving machine itself. Images from the captured streams of images may be analyzed to determine types of nearby heavy equipment, types of actions performable by the mobile earthmoving machine, types of attachments usable by the mobile earthmoving machine to carry out such actions, and types of materials acted upon by the mobile earthmoving machine during performance of the actions. Such information, including select images depicting the identified objects and actions, may be transmitted to a remote server system for additional processing. Such methods and systems improve the simplicity, versatility, and efficiency with which activities and events may be orchestrated at an earthmoving site.

In some embodiments, a method for orchestrating activities at an earthmoving site is described. The method may comprise capturing, by an image capturing device removably fixed to a mobile earthmoving machine, a stream of images recorded as captured digital data, wherein a field of view of the image capturing device overlaps with a working range of an attachment coupled to the mobile earthmoving machine. The method may further comprise selecting, by the image capturing device, a first subset of images from the stream of images captured during a first time period. The method may further comprise generating, by a first trained algorithm existing in a memory of the image capturing device, and using the first subset of images, a probability that the first subset of images depicts a first action of a plurality of actions performable by the mobile earthmoving machine. The method may further comprise determining, by the image capturing device based on the probability, that the mobile earthmoving machine was performing the first action during the first time period. The method may further comprise selecting, by the image capturing device, and in response to determining that the mobile earthmoving machine was performing the first action during the first time period, an image from the first subset of images. The method may further comprise transmitting, by the image capturing device, the image and a first indication that the mobile earthmoving machine was performing the first action during the first time period to a remote server system through a network.

In some embodiments, the method further comprises identifying, by the image capturing device, an object within a first image of the first subset of images. The method may further comprise classifying, by the image capturing device, the object as a first object type. The method may further comprise transmitting, by the image capturing device, and in response to classifying the object as the first object type, a second indication that the object was detected during the first time period to the remote server system through the network. In some embodiments, classifying the object comprises executing, using the first image, a second algorithm existing in the memory of the image capturing device trained to classify heavy equipment types, and the method further comprises determining a distance between the mobile earthmoving machine and the object based on positions of pixels of the object in the first image, and determining, based on the distance and the first action, that the first action is being performed on the object. In some embodiments, transmitting the second indication to the remote server is in further response to the determination that the first action is being performed on the object, and includes the first image.

In some embodiments, classifying the object as the first object type comprises executing, using the first image, a second algorithm existing in the memory of the image capturing device trained to classify an attachment type of the attachment coupled to the mobile earthmoving machine. In some embodiments, classifying the object as the first object type comprises executing, using the first image, a second algorithm existing in the memory of the image capturing device trained to classify a material type moveable by the attachment coupled to the mobile earthmoving machine.

In some embodiments, the method further comprises detecting, based on the determination that the mobile earthmoving machine was performing the first action and the classification of the object as the first object type, an anomaly associated with the object, the first action, or both; and modifying, in response to detecting the anomaly, an operation of the mobile earthmoving machine. In some embodiments, detecting the anomaly comprises determining that an action plan for the mobile earthmoving machine does not include the first object type, and modifying the operation of the mobile earthmoving machine comprises producing a warning signal at a user control interface of the mobile earthmoving machine. In some embodiments, the method further comprises detecting, from a plurality of subsets of images from the stream of images captured during a plurality of time periods including the first time period, a plurality of actions performed by the mobile earthmoving machine; determining, from the plurality of actions performed by the mobile earthmoving machine, a status of an event to be completed by the mobile earthmoving machine at the earthmoving site; and generating a report at a user interface indicating the status of the event. In some embodiments, the method further comprises tasking, in response to determining the status of the event, a second mobile earthmoving machine to help complete the event. In some embodiments, the plurality of actions performable by the mobile earthmoving machine includes at least one of: a scooping action, a rotating action, a loading action, and an undesignated action.

In some embodiments, a system for orchestrating activities at an earthmoving site is described. The system may comprise an image capturing device. In some embodiments, the image capturing device is removably fixable to a mobile earthmoving machine and includes: a camera for capturing images of a region of the earthmoving site; communication circuitry operable to transmit data to a remote server; memory for storing at least a portion of the captured images of the earthmoving site; and a processor communicatively coupled to the memory, the camera, and the communication circuitry. In some embodiments, the processor is capable of executing instructions in the memory to capture, while the image capturing device is removably fixed to the mobile earthmoving machine, a stream of images recorded as captured digital data, wherein a field of view of the camera overlaps with a working range of an attachment coupled to the mobile earthmoving machine. The instructions in the memory may further select a first subset of images from the stream of images captured during a first time period. The instructions in the memory may further generate, by a first trained algorithm existing in the memory, and using the first subset of images, a probability that the first subset of images depicts a first action of a plurality of actions performable by the mobile earthmoving machine. The instructions in the memory may further determine, based on the probability, that the mobile earthmoving machine was performing the first action during the first time period. The instructions in the memory may further select, in response to the determination that the mobile earthmoving machine was performing the first action during the first time period, an image from the first subset of images. The instructions in the memory may further transmit, by the communication circuitry, the image and a first indication that the mobile earthmoving machine was performing the first action during the first time period to a remote server through a network.

In some embodiments, the processor is further capable of executing instructions in the memory to: identify an object within a first image of the first subset of images; classify the object as a first object type; and transmit, in response to classifying the object as the first object type, a second indication that the object was detected during the first time period to the remote server through the network. In some embodiments, the system further comprises a remote server system including the remote server configured to: receive the first indication that the mobile earthmoving machine was performing the first action and the second indication that the object was detected; detect, based on the first indication and the second indication, an anomaly associated with the object, the first action, or both; and transmit, in response to detecting the anomaly, a third indication of the anomaly to the mobile earthmoving machine through the network.

In some embodiments, the system further comprises a display device configured to present the third indication to an operator of the mobile earthmoving machine in response to receiving the third indication from the remote server system. In some embodiments, the system further comprises an autonomous control device configured to control an operation of the mobile earthmoving machine and, in response to receiving the third indication from the remote server system, stop the mobile earthmoving machine from performing the first action.

In some embodiments, one or more non-transitory computer-readable storage media are described. The storage media may store instructions that, upon execution by one or more processors of an image capturing device removably fixed to a mobile earthmoving machine, cause the one or more processors to perform operations including capturing, a stream of images recorded as digital data by the image capturing device, wherein a field of view captured in the stream of images overlaps with a working range of an attachment coupled to the mobile earthmoving machine. The operations may further include selecting, a first subset of images from the stream of images captured during a first time period. The operations may further include generating, by a first trained algorithm, and using the first subset of images, a probability that the first subset of images depicts a first action of a plurality of actions performable by the mobile earthmoving machine. The operations may further include determining, based on the probability, that the mobile earthmoving machine was performing the first action during the first time period. The operations may further include selecting, in response to determining that the mobile earthmoving machine was performing the first action during the first time period, an image from the first subset of images. The operations may further include transmitting, the image and a first indication that the mobile earthmoving machine was performing the first action during the first time period to a remote server system through a network.

In some embodiments, the operations further include identifying, an object within a first image of the first subset of images; classifying, the object as a first object type; and transmitting, in response to classifying the object as the first object type, a second indication that the object was detected during the first time period to the remote server system through the network. In some embodiments, classifying the object comprises executing, using the first image, a second algorithm trained to classify heavy equipment types, and the operations further include: determining a distance between the mobile earthmoving machine and the object based on positions of pixels of the object in the first image and determining, based on the distance and the first action, that the first action is being performed on the object. In some embodiments, transmitting the second indication to the remote server is in further response to the determination that the first action is being performed on the object, and includes the first image. In some embodiments, classifying the object as the first object type comprises executing, using the first image, a second algorithm trained to classify an attachment type of the attachment coupled to the mobile earthmoving machine. In some embodiments, classifying the object as the first object type comprises executing, using the first image, a second algorithm trained to classify a material type moveable by the attachment coupled to the mobile earthmoving machine.

A better understanding of the nature and advantages of embodiments of the present disclosure may be gained with reference to the following detailed description and the accompanying drawings.

DETAILED DESCRIPTION

Figure 1:
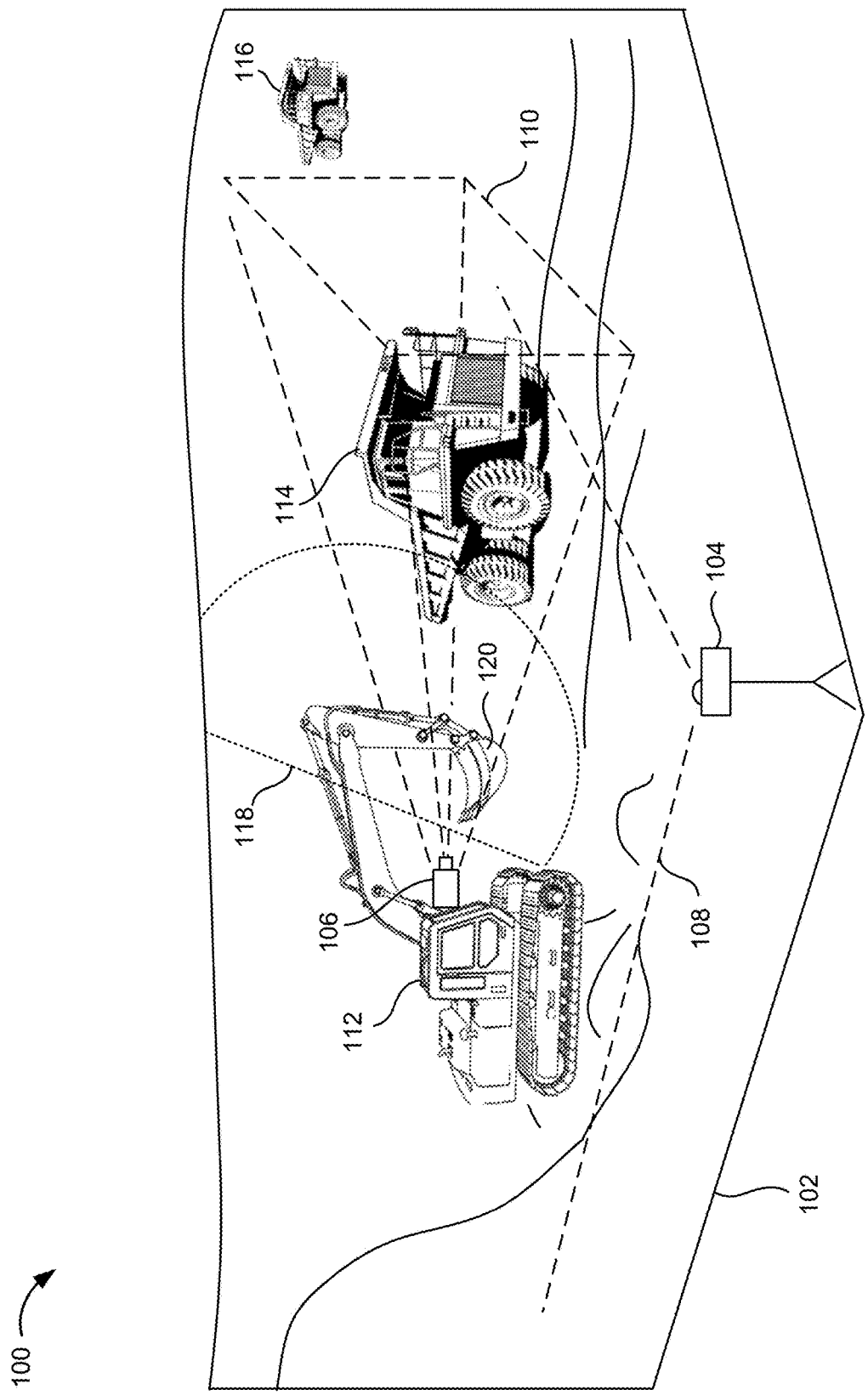
FIG. 1 is a simplified diagram of an example image capturing system implemented at an earthmoving site, according to some embodiments of the present disclosure.

Large earthmoving sites spanning a wide geographic region as described herein may include a symphony of activities and events concurrently carried out by an equally large ensemble of heavy equipment. Orchestrating the symphony of activities and events to ensure completion of an overall project plan in an accurate, efficient, and safe manner presents numerous challenges due to the size of the earthmoving site, the number and type of heavy equipment used to complete the activities, and the ever-changing nature of the environment and activities.

Various solutions may minimize the complexities associated with orchestrating activities at an earthmoving site including stationary image-based monitoring systems. Such stationary image-based systems may provide numerous benefits compared with alternative solutions, such as the ability to monitor movements and activities performed by a range of heavy equipment regardless of the entity (e.g., contractor or subcontractor) responsible for providing the equipment to the earthmoving site, as further described in U.S. Pat. No. 11,379,778, herein incorporated by reference in its entirety. While such systems may enable oversight into activities and events occurring within a region of an earthmoving site, the region under observation may be limited by the number of image capturing devices available at the earthmoving site due to the available field of view associated with each image capturing device. As the size of the earthmoving site increases, additional image capturing devices may be necessary to cover a broader area within the earthmoving site and/or it may become necessary to reposition existing image capturing devices to capture a new region within the earthmoving site. Accordingly, there is a need for a dynamic image-based monitoring system capable of adapting to the ever-changing conditions and activities at the earthmoving site.

Embodiments describe an image capturing system that includes one or more image capturing devices fixed to mobile earthmoving machines. Each image capturing device can monitor movement of the machine to which it is affixed, and capture streams of images from the perspective of the earthmoving machine, including a portion of the earthmoving machine itself. Each image capturing device can process the stream of images locally while selectively sending at least some of the images included in the stream to a remote server for additional processing. This selective sending of captured images can result in efficient device and system operation by only sending and analyzing a subset of pertinent images instead of every captured image or an entire stream of images.

In some embodiments, each image capturing device can perform computer vision to identify types of objects present in the field of view of the image capturing device as well as types of actions being performed by the earthmoving machine to which it is attached, as will be discussed herein with respect to FIGS. 2 and 3. This data can be used to monitor and manage events scheduled for completion by the mobile earthmoving machines. In turn, operation of the mobile earthmoving machines may be modified in response to the data generated by the image capturing devices in order to improve productivity and efficiency of the earthmoving machines as they carry out scheduled actions and activities. Monitoring actions from the perspective of a mobile earthmoving machine in this way can provide better oversight into actions being performed across a wide geographic region by providing monitoring and management that is as dynamic as the objects that are intended to be monitored and managed. Details of an image capturing system and its operations/capabilities are discussed in more detail herein.

I. Image Capturing System

FIG. 1 is a simplified diagram of an example image capturing system 100 implemented at an earthmoving site 102, according to some embodiments of the present disclosure. Earthmoving site 102 may be a construction site, a quarry, a mine, and the like. Various heavy equipment may be present within, and move throughout, earthmoving site 102 to perform various functions within earthmoving site 102, such as excavating, surface preparation, and the like. As further illustrated, heavy equipment present within earthmoving site 102 may include a variety of mobile earthmoving machines, such as excavator 112, and first and second dump trucks 114 and 116.

Image capturing system 100 can include a plurality of image capturing devices, such as stationary image capturing device 104 and mobile image capturing device 106 for capturing images at earthmoving site 102. As described further below, image capturing devices may include one or more digital cameras, one or more processors configured to execute software programmed to analyze the digital data captured by the cameras, and/or one or more communications modules configured to transmit the analyzed data to a remote system. Image capturing devices may be freestanding or fixed to an object. For example, and as illustrated, stationary image capturing device 104 can be positioned at a first location within earthmoving site 102. As further illustrated, mobile image capturing device 106 can be removably fixed to a mobile object, such as excavator 112. While described herein as stationary versus mobile image capturing devices, this naming convention merely serves the purpose of describing the current state as illustrated in the figures, and it should be understood that image capturing devices in accordance with the present disclosure may be repositioned within earthmoving site 102, removed from a mobile object and fixed to a different mobile object, removed from a mobile object and positioned at a fixed location within earthmoving site 102, or vice versa.

From the first location within earthmoving site 102, stationary image capturing device 104 may capture images of a region of earthmoving site 102 within first field of view 108. Similarly, mobile image capturing device 106 may capture images of a dynamic region of earthmoving site 102 extending outward from the mobile object to which it is attached, in this case excavator 112, within second field of view 110. That is to say, as the position and orientation of excavator 112 changes within earthmoving site 102, second field of view 110 will change accordingly.

As described above, image capturing devices in accordance with the present disclosure, such as mobile image capturing device 106, may be removably fixed to a mobile earthmoving machine, such as excavator 112. The position and/or orientation in which an image capturing device is fixed to the mobile earthmoving machine may be selected such that the field of view overlaps with a working range of an attachment coupled to the mobile earthmoving machine. For example, as illustrated, second field of view 110 overlaps with working range 118 of bucket 120 coupled to excavator 112. In some embodiments, the position and orientation of the image capturing device is based on the vantage point of an operator of the mobile earthmoving machine. For example, the position and orientation of the image capturing device may be above and behind an operator's head within a cab of the mobile earthmoving machine to provide a field of view looking outward through a front or side window of the cab. Additionally, or alternatively, the position and orientation may be outside the cab along an edge of a front or side window, or on the roof of the cab.

In some embodiments, the image capturing device is positioned on a moveable surface such that an attachment coupled to the mobile earthmoving machine stays within the field of view of the image capturing device. For example, an image capturing device may be positioned on a distal section of an excavator arm with a field of view encompassing an attachment point for one or more types of attachments, as described further below. Additionally, or alternatively, the field of view may be selected such that other heavy equipment within the working range of the attachment coupled to the mobile earthmoving machine are also within the field of view. For example, as illustrated, second field of view 110 from mobile image capturing device 106 may include first dump truck 114 within working range 118 of bucket 120.

The location at which stationary image capturing device 104 is positioned may provide high level visibility into actions being performed across a region of earthmoving site 102. As described further herein, this may provide various technical advantages including the ability to monitor the movement, actions, and events performed by various types of heavy equipment within the region regardless of whether or not the heavy equipment has an individual tracking, control, or image capturing device. On the other hand, mobile image capturing device 106 may provide more granular insight into activities being performed by a particular machine capable of moving between multiple regions of earthmoving site 102. Attaching mobile image capturing device 106 to a mobile earthmoving machine, such as excavator 112, may provide multiple benefits. For example, by enabling the monitoring and management of activities performed by a mobile earthmoving machine, the number of image capturing devices necessary for a large earthmoving site may be greatly reduced. Additionally, or alternatively, the need to move stationary image capturing devices from one location to another as activities shift from region to region within an earthmoving site may be reduced.

Additional technological benefits achieved by providing more granular insight from the perspective of a particular machine may include improved accuracy in detecting actions being performed by the particular machine, which may therefore lead to better management and orchestration of activities and events schedule for completion by the particular machine and other supporting heavy equipment, as described further herein. Similarly, the combined insights provided by stationary and mobile image capturing devices may enable improved optimization of workflow scheduling at an earthmoving site. For example, while a mobile image capturing device fixed to an excavator may indicate that the excavator is scooping and loading material at an optimal frequency, a stationary image capturing device at an edge of the earthmoving site may indicate that there are too many dump trucks waiting to be loaded, and therefore the number of dump trucks tasked to support the excavator may be reduced and/or shifted to support other activities. As another example, while a stationary image capturing device may indicate that there are an optimal number of dump trucks tasked with supporting an excavator, a mobile image capturing device fixed to the excavator may indicate that an attachment type coupled to the excavator is not an optimal type for the material being excavated.

II. Computer Vision and Machine Learning

According to some embodiments of the present disclosure, various components of an image capturing system can perform computer vision and machine learning techniques on captured images to extract information from objects and movement at the earthmoving site. For example, an image capturing device and/or a remote server can analyze pixel display patterns of captured images to identify and/or track certain features, characteristics, and/or movement of heavy equipment within the captured images. Performing computer vision to identify and/or track actions performed by heavy equipment at the source of the action (e.g., by an image capturing device fixed to a mobile earthmoving machine performing the activity) allows the image capturing system to adapt to the ever changing conditions and activity present at an earthmoving site, meaning the system can monitor the productivity of heavy equipment regardless of where the activity is being performed. This substantially simplifies the tracking process and improves the capabilities and versatility of the image capturing system. Furthermore, such image processing can enable useful functionality, such as image classification, object detection, activity recognition, event recognition, and anomaly detection for gauging productivity and improving safety at an earthmoving site, as will be discussed further herein.

A. Image Classification

Image classification is a process that identifies an object in a captured image, and then creates a classification label for the captured image based on the type of object. In some embodiments, an algorithm trained by machine learning techniques can be applied to the captured image to classify the object type. For instance, digital data representing a captured image depicting an excavator bucket can be put into an image classification module, which can apply a trained algorithm to the digital data and output an attachment type label for the captured image corresponding to an excavator bucket type.

Additionally, or alternatively, an algorithm trained by machine learning techniques may generate one or more probabilities associated with classification types for an object. For example, in addition to classifying the object as an excavator bucket, the trained algorithm may generate a first probability that the object is an excavator bucket, as well as a second probability that the object is of a second classification type. In some embodiments, the algorithm selects the classification type with the highest associated probability as the primary classification label to be associated with the captured image. Additionally, or alternatively, the algorithm may compare the probability with a threshold probability before outputting the classification label for the captured image. In the event that none of the potential classification types is associated with a probability exceeding the threshold probability, the algorithm may omit a classification label for the captured image and/or apply a classification label indicating that an object was detected but could not be classified.

In some embodiments, image classification can identify more than one object in the captured image, and generate labels corresponding to the identified objects. For example, digital data representing a captured image of an excavator bucket and a dump truck can be put into an image classification module, which can apply an algorithm to the digital data and output an excavator bucket label and a dump truck label for the captured image. Similarly, image classification can determine when there are duplicate objects within the captured image. For example, if digital data representing a captured image including an excavator bucket and two or more dump trucks are put into an image classification module, the module can apply an algorithm to the digital data and output an excavator bucket label and two or more dump truck labels for the captured image.

Once the label is determined, corresponding information can be transmitted to a remote system for further processing and/or outputted to a user to indicate what types of heavy equipment are identified at the earthmoving site. FIG. 2 is an example output 200 by a user interface of an image capturing system performing image classification, object detection, and action recognition, according to some embodiments of the present disclosure. Output 200 can be a graphical output report having a primary section 202 that displays what is captured by an image capturing device. In the example shown in FIG. 2, the image that is captured and displayed in main section 202 is from the perspective of mobile image capturing device 106 in FIG. 1.

As the system performs computer vision, the system can identify that the captured image includes multiple groupings of pixels 204 and 206 that are identified as meaningful objects. Machine learning can then be applied to those groupings of pixels to identify first and second groupings of pixels 204-1 and 204-2 as first and second dump truck 205-1 and 205-2, e.g., first and second dump truck 114 and 116 in FIG. 1, and third grouping of pixels 206 as excavator bucket 207, e.g., bucket 120 coupled to excavator 112 in FIG. 1.

In some embodiments, machine learning can identify a single grouping of pixels as being in one of multiple possible states. For example, as a part of, or after, identifying first grouping of pixels 204-1 as a dump truck, machine learning may determine that the dump truck is in an empty state. Similarly, from third grouping of pixels 206, machine learning may determine that the excavator bucket is in a full state. Other possible states may be defined and/or identifiable based on the capabilities or features of an object. For example, dump trucks with tilting or rotating beds may be identified as being in one of various states ranging from a flat state associated with transport or loading, and a tilted state associated with dumping or pouring the contents of the bed out. Additionally, or alternatively, machine learning may determine that a single grouping of pixels includes multiple meaningful objects and proceed to classify each object. For example, machine learning can be applied to third grouping of pixels 206 to identify excavator bucket 207 and surface material 208 (e.g., dirt, sand, rock, and the like).

Output 200 can also include a secondary section 210 positioned adjacent to primary section 202. Secondary section 210 can include an arrangement of icons 212 indicating the classifications identified in a captured image. Each icon 212 may include a classification type, a probability associated with the classification type, and an image associated with the classification type or category of classification type. For example, as illustrated, secondary section 210 can be a column of icons 212 indicating the classified objects identified in the captured image currently displayed in primary section 202, including first icon 212-1 associated with first dump truck 205-1, second icon 212-2 associated with excavator bucket 207, third icon 212-3 associated with surface material 208, and fourth icon 212-4 associated with second dump truck 205-2.

In some embodiments, icons 212 are arranged in order of the probabilities associated with each classified object in the captured image. For example, as illustrated, icons 212 are arranged in descending order based on their respective probabilities. Additional criteria may be used to arrange icons 212. For example, icons 212 may be arranged according to: user preference, level of importance to a particular task depicted in the captured image, frequency with which the object is identified in a stream of images including the captured image, proximity to the image capturing device that captured the image, and the like.

In some embodiments, secondary section 210 includes icons 212 indicating classifications identified in a stream of images. For example, the captured image depicted in primary section 202 may be one of a plurality of images captured over a period of time, as in a video stream. In this case, while secondary section 210 may include an icon for a particular object, the object may not currently be displayed in primary section 210. In some embodiments, selecting an icon corresponding to an object not currently being displayed may cause the user interface to replace the currently displayed image with a different image showing the object.

In some embodiments, image classification is performed at the edge, e.g., locally at the earthmoving site, by an image capturing device. Accordingly, the image capturing device can perform computer vision and machine learning techniques to its captured images in real time to identify objects within its field of view quicker and cheaper than it would be if the image classifications were performed by a remote server due to consequences associated with transmission of captured images to the remote server. By performing image classification at the edge, only the results from computer vision and machine learning may be sent to the remote server. Such transmission architectures can send data in lightweight data-interchange formats, such as JavaScript Object Notation (JSON) or Extensible Markup Language (XML), to minimize bandwidth and data transmission cost.

Additionally, or alternatively, by performing the image classification on the image capturing device, a select subset of captured images may be transmitted to a remote system or device. Such transmission of selected subsets of captured images may enable various types of human intervention. For example, the selected subset of captured images may be transmitted for verification purposes to ensure that objects are being accurately classified in the captured images. In some embodiments, the verification results may be propagated back to the classification module to improve future classification results. For example, based on an indication that an object was classified correctly, a predictive power associated with a machine learning model feature may be increased. As another example, based on an indication that an object was incorrectly classified, and given a correct classification, the machine learning model may be dynamically retrained using the image and the correct classification.

In some embodiments, the select subset of captured images transmitted to the remote system are selected based on one or more preprogrammed conditions. For example, a captured image may be selected for transmission in response to the detection or classification of an object of interest within the image. An object of interest may be selected based on a schedule of activities for an earthmoving site. For example, based on a schedule of activities including multiple rounds of dump trucks arriving at an excavator to receive surface material, a captured image may be transmitted each time a new dump truck is classified. Additionally, or alternatively, objects of interest may include anomalous objects, such as personnel or types of heavy equipment that are not included in a schedule of activities associated with the activity being performed by the equipment to which the image capturing device is affixed. In some embodiments, captured images are selected according to a predefined frequency such as every 3 seconds, 15 seconds, 1 minute, 1 hour, or a similar frequency selected to ensure classification accuracy via one or more verification methods.

Figure 2:
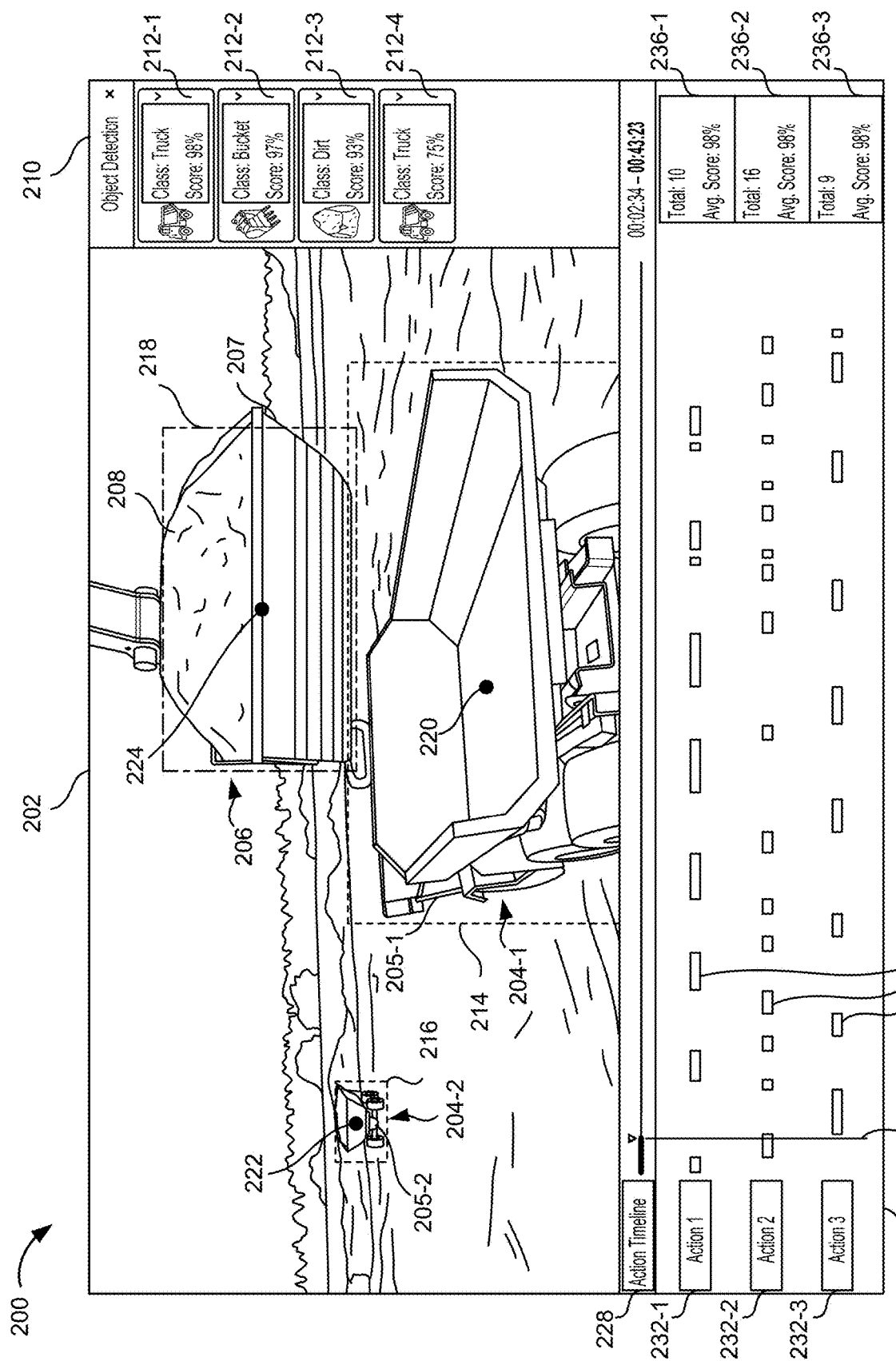
FIG. 2 is an example output by a user interface of an image capturing system performing image classification, object detection, and action recognition, according to some embodiments of the present disclosure.

Although FIG. 2 shows an example output from a user interface, it is to be appreciated that image classification need not be performed in conjunction with outputting to a user interface. In other words, image classification can be performed to identify types of heavy equipment without having to display output 200 to a user. Output 200 is shown for ease of understanding during discussion of image classification. In some embodiments, the result of image classification can be the JSON data that is used for storage into a database and/or for further processing to enable additional functionality.

B. Object Detection

In addition to image classification, an image capturing system can perform object detection. Object detection is a process that analyzes the digital data representing the captured image to identify a pixel location of an object within a two-dimensional (2D) field of view of an image capturing device and form a boundary around the object. The boundary can be a boundary box formed of boundary lines that extend in horizontal and vertical directions and that are tangential to the outermost surfaces of the object. Alternatively, the boundary can be a boundary line that conforms to the outer profile of the object, or the boundary can be defined by an outer edge of a virtual shape that overlaps with the silhouette of the object. In some embodiments, the system can use computer vision to analyze the digital data representing the captured image to identify the outermost surfaces of the object for defining the boundary. It is to be appreciated that the term "pixel location" is intended to mean a 2D location of a pixel within an image captured within a field of view of an image capturing device, while "three-dimensional" or "3D" position is intended to mean x (lateral), y (depth), and z (height) position in the real 3D world at the earthmoving site, from the perspective of an image capturing device.

As further illustrated in FIG. 2, primary section 202 may include outputs from object detection. For example, first boundary 214 may be a digital boundary box positioned around first dump truck 205-1, second boundary 216 may be positioned around second dump truck 205-2, and third boundary 218 may be positioned around excavator bucket 207 and surface material 208. The digital boundary boxes may be defined by horizontal and vertical boundary lines that are tangential to the farthest surfaces at the top, bottom, and opposing lateral sides of respective objects identified within the field of view of the image capturing device. Each boundary line can be digital data defining a virtual line of pixels and their corresponding pixel coordinates within the field of view, where the field of view is represented as a 2D array of pixels displaying the captured image as shown in primary section 202. Using this information, positions 220, 222, and 224 of first dump truck 205-1, second dump truck 205-2, and excavator bucket 207 and surface material 208 respectively, can be determined, such as by calculating respective centers of squares/rectangles formed by boundaries 214, 216, and 218. Positions 220, 222, and 224 can be pixel coordinate locations within the field of view of the image capturing device, as opposed to a position in 3D space within the earthmoving site. In instances where the boundary is formed of a boundary line that conforms to the outer surface of the object, or is defined by the outer profile of a virtual shape conforming to the silhouette of the object, the position can be determined using center-of-mass calculations in some embodiments.

In some embodiments, the relative sizes of the boundaries and the positions identified in an image are used to determine relative distances between the corresponding objects in the real world. Based on known, or estimated, dimensions in the real world for the corresponding objects identified in an image, and a comparison of the object boundaries detected in the image, a relative distance may be determined. For example, as illustrated, based on the corresponding sizes of boundaries 214 and 218, as well as positions 220 and 224, it may be determined that first dump truck 205-1 and excavator bucket 207 are in close proximity with one another in the real world. By comparison, because the relative size of boundary 216 compared with boundary 214 is smaller, it may be determined that first dump truck 205-1 is closer to the image capturing device than second dump truck 205-2.

In some embodiments, image capturing devices are configured to transmit an indication of the relative distance between objects to a remote system. Transmitting the indication of the relative distance may occur in response to a determination that the relative distance is less than a predefined threshold distance. For example, in response to determining that a piece of heavy equipment, such as a dump truck, is within a working range of an attachment coupled to a mobile earthmoving machine, such as an excavator, the image capturing device may transmit this information to a remote system. This information may then be used to verify that the piece of heavy equipment was, or was not, scheduled to support one or more activities being performed by the mobile earthmoving machine. Alternatively, in response to detecting a human within close proximity to an excavator, the image capturing device may transmit a safety warning to the remote system and/or cause the excavator to stop a current action until the human is no longer detected within close proximity to the excavator. Additionally, or alternatively, the relative distance between objects detected in an image may be used as a trigger to select the image for transmission to a remote system for additional verification.

Object detection can be performed locally by an image capturing device at the earthmoving site, or it can be performed remotely by a remote server once the captured images are sent to the remote server by the image capturing device. In instances where the image capturing device can perform object detection, a high-performance graphical processor can be implemented to satisfy processing demand. If the image capturing device can perform image classification and not object detection, then a graphical processor having lower performance than the high-performance processor can be implemented, thereby resulting in a lower cost image capturing device.

While illustrated and described as being displayed by a user interface, like image classification, object detection need not be performed in conjunction with outputting to a user interface. That is, the positions and boundaries of the objects captured at the earthmoving site as a result of object detection can be outputted as JSON data that is used for storage into a database and/or for further processing to enable additional functionality, such as selective data transmission to a remote server for verification.

C. Action Recognition

In addition to image classification and object detection, image capturing systems can also perform action recognition. Action recognition is a process that analyzes the digital data representing movement of objects across a sequence of captured images to identify an action being performed by the object, or an action being performed by an object from which the images were captured, such as a mobile earthmoving machine. For instance, digital data representing a sequence of captured images taken by an image capturing device removably fixed to an excavator can be put into an action recognition module, which can apply a trained action classification algorithm to the digital data to output an action classification label for the sequence of captured images corresponding to an action performable by the excavator, such as scooping something up, rotating around its axis, pouring something out, or an undefined task.

Additionally, or alternatively, an algorithm trained by machine learning techniques may generate one or more probabilities associated with action classifications. For example, in addition to classifying an action as a scooping type action, the trained algorithm may generate a first probability that the action depicted in the sequence of captured images is a scooping type action, as well as a second probability that the action is a second action type. In some embodiments, the action recognition module selects the classification with the highest associated probability as the primary classification to be associated with the sequence of captured images. Additionally, or alternatively, the action recognition module may compare the probability with a threshold probability before outputting the classification for the sequence of captured images. In the event that none of the potential classifications is associated with a probability exceeding the threshold probability, the action recognition module may omit a classification label for the sequence of captured images and/or apply a label indicating that the action is an undefined or other action type.

Figure 3:
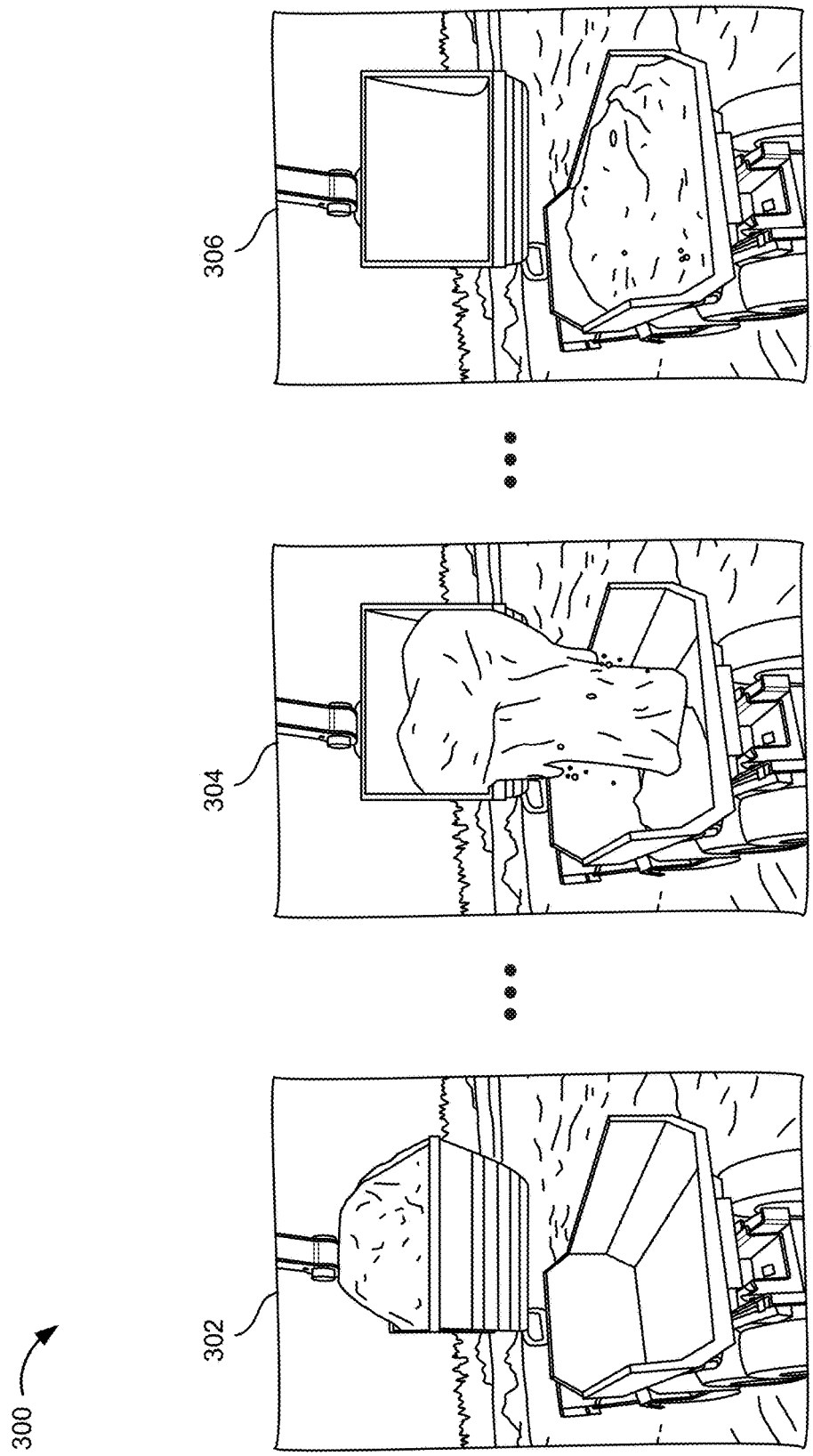
FIG. 3 illustrates an exemplary stream of images captured by an image capturing device to perform image classification, object detection, and action recognition, according to some embodiments of the present disclosure.

FIG. 3 illustrates an exemplary stream of images 300 captured by an image capturing device to perform action recognition, according to some embodiments of the present disclosure. As illustrated, stream of images 300 depicts an excavator, e.g., excavator 112 in FIG. 1, at various states of pouring out surface material from a bucket coupled to the excavator into the bed of a dump truck. For example, first image 302 depicts the excavator bucket full of surface material (e.g., dirt) above an empty dump truck. Second image 304 depicts the surface material falling from the excavator bucket into the bed of the dump truck. Third image 306 depicts the excavator bucket upturned and empty of the surface material with the resulting pile of surface material in the bed of the dump truck.

Similar sequences of images depicting various actions may be used to train an action classification algorithm. For example, a sequence of images depicting an excavator bucket moving downward out of the field of view and back upward into the field of view may indicate a scooping action type. As another example, a sequence of images depicting translational movement in the far field with or without a stationary excavator bucket in the near field of the sequence of images may indicate a rotation action type. Alternatively, a sequence of images that do not depict any movement may indicate an idle action type. Additional, or alternative, action types may be used to describe various actions performable by a mobile earthmoving machine to which an image capturing device is removably fixed and/or heavy equipment within the field of view of the image capturing device.

Stream of images 300 may be captured by an image capturing device removably fixed to the excavator, as described above. As further illustrated, the field of view of the image capturing device overlaps with a working range of the bucket coupled to the excavator. In some embodiments, stream of images 300 is captured as a continuous video stream at 15 frames per second (FPS), 30 FPS, 60 FPS, or a similarly suitable frame rate for detecting actions performed by heavy equipment at an earthmoving site.

An action recognition module may select the sequence of images 302, 304, and 306 from stream of images 300 for input to a trained algorithm, such as a machine learning algorithm. A new sequence of images may be selected, and thereafter classified, for each of a plurality of time windows included in stream of images 300. Each time window may correspond to a predefined length of time, such as half a second, 1 second, 3 seconds, 5 seconds, or a similarly suitable time selected to reduce the possibility of missing an action that occurred during the time window. For example, if it is possible to perform one or more actions in five seconds or less, the action classification algorithm may be trained using a corresponding time window of less than 5 seconds to ensure that only one action is depicted in a particular sequence of images to be classified. Additionally, or alternatively, sequences of images may be selected to produce overlapping time windows. For example, a first sequence of images may be selected starting at time 0 and ending at 1 second of the stream of images, a second sequence of images may be selected from time 0.5 seconds to 1.5 seconds of the stream of images, and so on. For each time window, the sequence of images may be down-sampled or up-sampled from the stream of images based on the number of images in the training data used to train the action classification algorithm. For example, given an action classification algorithm trained to detect actions occurring in a one second time window using 15 frames (i.e., a sequence of 15 images), and a stream of images captured at 30 FPS, every other frame from the stream of images may be selected for each second of the stream of images to be input to the action classification algorithm.

In some embodiments, images from the stream of images are selected for input to the image classification and/or object detection algorithms described above. For example, each image in the stream of images may be input to one or more image classification and/or object detection algorithms in parallel, or in sequence, with the processing being performed by the action recognition module. Alternatively, images may be selected at a predefined frequency for processing by a corresponding image classification and/or object detection algorithm to reduce consumption of processing resources.

The frequency at which images are selected from the stream of images may be predefined based on the expected frequency with which objects within a field of view of the image capturing device move into and out of view and/or change. For example, the frequency with which images are selected for an image classification algorithm trained to detect excavator attachment types may be comparatively lower than the frequency with which images are selected for an image classification algorithm trained to detect heavy equipment types based on the lower frequency at which excavator attachments are changed compared to the frequency at which dump trucks arrive within, and leave, the proximity of an excavator.

In some embodiments, images are selected from a sequence of images based on the sequence of images being classified as depicting a certain type of action. For example, an image may be selected from a sequence of images classified as depicting an excavator bucket pouring out material in order to verify that the correct equipment (e.g., a dump truck) was present to receive the material, or that the material was the correct type of material (e.g., dirt as opposed to rock or sand). Additionally, or alternatively, sequences of images may be selected from the stream of images based on an image included in the sequence being classified as including an object of interest. For example, upon classifying an object in an image as a dump truck, a sequence of images leading up to, and proceeding from the image may be selected for additional processing by the action recognition module to determine whether a pouring action type is depicted in the sequence of images.

As sequences of images corresponding to time windows within the stream of images are classified by the action classification algorithm, the action recognition module may store each assigned classification in association with the corresponding time window. In response to detecting a change in the action classification from a first action type for a first time window to a second action type for a subsequent time window, the action recognition module may determine that the action corresponding to the first action type was being performed for a first time period encompassing each time window for which the first action type was assigned by the action classification algorithm. For example, after receiving a scooping action type classification for consecutive time windows within a 30 second time period, the action recognition module may determine that the action being performed by an excavator to which the image capturing device is attached was a scooping action during that 30 second time period upon receiving a new a rotation action type classification for a subsequent time window.

In some embodiments, action recognition is performed at the edge, e.g., locally by an image capturing device removably fixed to a mobile earthmoving machine. Accordingly, the image capturing device can apply computer vision and machine learning techniques to its captured stream of images in real time to identify actions performed by the particular mobile earthmoving machine quicker and cheaper than it would be if action recognition were performed by a remote server due to consequences associated with transmission of a stream of images to the remote server. By performing action recognition at the edge, only the results from computer vision and machine learning may be sent to the remote server. Such transmission architectures can send data in lightweight data-interchange formats, such as JavaScript Object Notation (JSON) or Extensible Markup Language (XML), to minimize bandwidth and data transmission cost.

Additionally, or alternatively, by performing the action recognition on the image capturing device, a select subset of captured images may be transmitted to a remote system or device. Such transmission of selected subsets of captured images may enable various types of human intervention. For example, the selected subset of captured images may be transmitted for verification purposes to ensure that actions are being accurately classified. In some embodiments, the verification results may be propagated back to the action recognition module to improve future classification results. For example, based on an indication that an action was classified correctly, a predictive power associated with a machine learning model feature may be increased. As another example, based on an indication that an action was incorrectly classified for a sequence of images, and replaced with a correct classification, the machine learning model may be dynamically retrained using the sequence of images and the correct classification.

In some embodiments, the select subset of captured images transmitted to the remote system are selected based on one or more preprogrammed conditions. For example, a captured image may be selected for transmission in response to the detection or classification of an action of interest within the image. An action of interest may be selected based on a schedule of activities or events at an earthmoving site and/or for a particular earthmoving machine. For example, based on a schedule of events including filling a number of dump trucks with surface material by a particular excavator, a captured image, or sequence of images, may be transmitted each time a pouring action type is classified. Additionally, or alternatively, actions of interest may include anomalous actions, or sequences of actions, which are inconsistent with performance of a particular activity or event schedule for completion by an earthmoving machine. For example, multiple sequences of scooping and rotating actions without a pouring action may be identified as an anomaly.

Returning to FIG. 2, output 200 may include a third section 226 positioned adjacent to primary section 202 and secondary section 210. Third section 226 can include action timeline 228. Action timeline 228 may represent a period of time during which actions performed by one or more earthmoving machines at an earthmoving site were detected by one or more image capturing devices. As described above, the captured image illustrated in primary section 202 may be a single image included in a stream of images such as stream of images 300 described above. Further, primary section 202 may be configured to play back an entire stream of images (e.g., video) captured by the image capturing device, and/or images selected from the stream of images for transmission to output 200 by the image capturing device according to one or more triggers and/or conditions, as further described above.

Additionally, or alternatively, primary section 202 may be configured to present images, or playback streams of images, captured by multiple image capturing devices during the period of time represented by action timeline. For example, timestamps associated with images, or streams of images, captured by one or more image capturing device may be synchronized along action timeline 228 for presentation in primary section 202. In this way, images, or streams of images, depicting relevant actions performed by various mobile earthmoving machines across one or more regions of the earthmoving site, may be automatically compiled and surfaced to a user in a unified manner. Presenting such relevant information relating to multiple actions taking place across the earthmoving site in a unified manner allows for more efficient management and control of the various actions scheduled to take place by reducing unnecessary navigation between multiple user interfaces corresponding to distinct streams of data provided by individual image capturing devices.

Third section 226 may include a slider for controlling playback or review of one or more actions detected over the period of time corresponding to action timeline 228. Additionally, or alternatively, third section 226 may include one or more playback controls, such as a play/pause option, track forward and backward options, playback speed options, track selection dialogs, and other similar media playback controls. During playback of the stream of images, and/or presentation of select images, progress bar 230 may indicate the point in time within action timeline 228 corresponding to the current image displayed in primary section 202.

Third section 226 may further include one or more action tracks 232 corresponding to actions performable by a mobile earthmoving machine. For example, first action track 232-1 may correspond to a scooping action type, second action track 232-2 may correspond to a rotation action type, and third action track 232-3 may correspond to a pouring action type. Each action track 232 may include one or more windows 234 representing time periods during which an action recognition module determined that the mobile earthmoving machine was performing a particular action.

Each action track 232 may include a summary field 236 including a summary report for the action type corresponding to the respective action track 232. For example, first summary field 236-1 may indicate that, during the period of time represented by action timeline 228 (e.g., within a stream of images), a scooping action type was detected a total of 10 times with an average classification confidence of 98%. Similarly, second summary field 236-2 may indicate that a rotation action type was detected 16 times, and third summary field 236-3 may indicate that a pouring action type was detected 9 times.

Although FIG. 2 shows an example output from a user interface, it is to be appreciated that action recognition need not be performed in conjunction with outputting to a user interface. In other words, action recognition can be performed to identify types of actions being performed by a mobile earthmoving machine without having to display output 200 to a user. Output 200 is shown for ease of understanding during discussion of image classification. In some embodiments, the result of action recognition can be the JSON data that is used for storage into a database and/or for further processing to enable additional functionality.

D. Event Recognition and Anomaly Detection

In addition to image classification, object detection, and action recognition, image capturing systems according to the present disclosure can also perform event recognition and anomaly detection. Event recognition is a process that analyzes a series of identified objects and/or actions to identify an event, such as filling a dump truck. For instance, a system can perform event recognition to determine that a dump truck has been filled after the system has identified a sequence of scooping, rotating, pouring, and rotating actions for a predetermined number of repetitions.

An event recognition module may correlate data from each of the image processing modules described above to detect events. For example, a sequence of actions associated with filling a dump truck may be verified as corresponding to filling a dump truck in response to a determination that a dump truck classification was detected during each time period associated with the pouring action type.

Event recognition may be used to monitor and manage a schedule of activities and/or events at an earthmoving site. Based on the number, frequency, and/or timing of events detected at the earthmoving site, it may be determined whether a project is behind schedule, on schedule, or ahead of schedule. For example, based on an overall project plan including the removal of a certain amount of surface material from a region, it may be determined that 20 dump trucks must be filled with surface material. As the event recognition module detects completed events, the status of the project plan may be updated to indicate the progress.

Similarly, an event recognition module may provide additional insights associated with the detection of each event. For example, the event recognition module may indicate the amount of time it took to fill a dump truck, the excavator attachment type used to complete the event, the type or size of the dump truck that was filled, an amount and/or type of surface material that the dump truck was filled with, and the like.

Such insights may in turn be used to adjust the overall project plan, tasking associated with a particular earthmoving machine, and the like. For example, based on insights associated with an event indicating that it took 30 minutes to fill a dump truck with an excavator bucket of a certain size, tasking for the excavator may be adjusted to include changing to a larger bucket size to decrease the amount of time it takes to fill a dump truck. As another example, based on insights indicating that an idle action type was detected more than a predetermined number of times, and/or for more than a predetermined amount of time, between filling subsequent dump trucks, it may be determined that additional dump trucks should be tasked to support the excavator in order to reduce time spent waiting for dump trucks to arrive at the excavator.

Similar to event recognition, object and/or action classifications may be analyzed to detect anomalies associated with the detected objects and/or actions. Anomalies may be detected when a classification type is not included in an action plan. Action plans may be associated with a particular mobile earthmoving machine. For example, an action plan for an excavator may indicate that the excavator is tasked with removing a predetermined amount of dirt from a region, loading a predetermined number of dump trucks with surface material from a particular location, an attachment type to be used to complete the action plan, and the like. Additionally, or alternatively, action plans may represent a higher-level plan of activities and events for an earthmoving site involving various personnel, heavy equipment, materials, and the like.

Anomalies associated with an object may be detected when an object type classification is not included in an action plan. For example, an anomaly may be detected in response to classification of an object as a human in an image captured by an image capturing device removably fixed to a mobile earthmoving machine when personnel are not expected to be in the vicinity of the mobile earthmoving machine. As another example, an anomaly may be detected in response to classification of surface material in an excavator bucket as dirt when a project plan for the excavator includes removing rock only. Similar anomalies may be detected in response to heavy equipment type classifications not matching with heavy equipment tasking and/or an attachment type classifications not matching with an expected attachment type for a mobile earthmoving machine.

Similarly, anomalies associated with actions may be detected when an action type classification is not included an action plan. For example, an anomaly may be detected when a transit action type classification indicating that a mobile earthmoving machine is in transit from one location to another for an extended period of time when an action plan for the mobile earthmoving machine does not involve transit to a different location. As another example, an anomaly may be detected in response to classification of a scooping action type being performed by an excavator when an action plan for the excavator indicates that it has already completed the predetermined number of events planned for the excavator.

Operations at the earthmoving site may be modified in response to detecting an anomaly. For example, in response to detecting a human, or other unwanted heavy equipment in close proximity to an excavator, a warning signal may be produced by a control module of the excavator. The warning signal may include auditory, visual, or haptic feedback, such as a warning sound or light, a vibration device installed in an operator's chair or steering control, and the like. In the case of autonomous, or semi-autonomous, earthmoving machines, one or more operations may automatically be modified in response to detecting an anomaly.

In some embodiments, event recognition and/or anomaly detection can be performed locally by an image capturing device removably fixed to a mobile earthmoving machine. That way, in the case of anomaly detection for safety awareness, captured images do not need to be sent over a network to a remote server and can instead be analyzed locally to provide a fast response time for alerting personnel at the earthmoving site. Additionally, or alternatively, JSON data, or other similarly structured data, representing the results of image classification, object detection, and/or action recognition generated by one or more image capturing devices may be transmitted to a remote server system for event recognition and/or anomaly detection. For example, the remote system used to perform event recognition may be integrated with the system used for project planning and management. In this way, the remote system may maintain central control and oversight over actions being performed across the earthmoving site.

III. Architecture of the Image Capturing System

Figure 4:
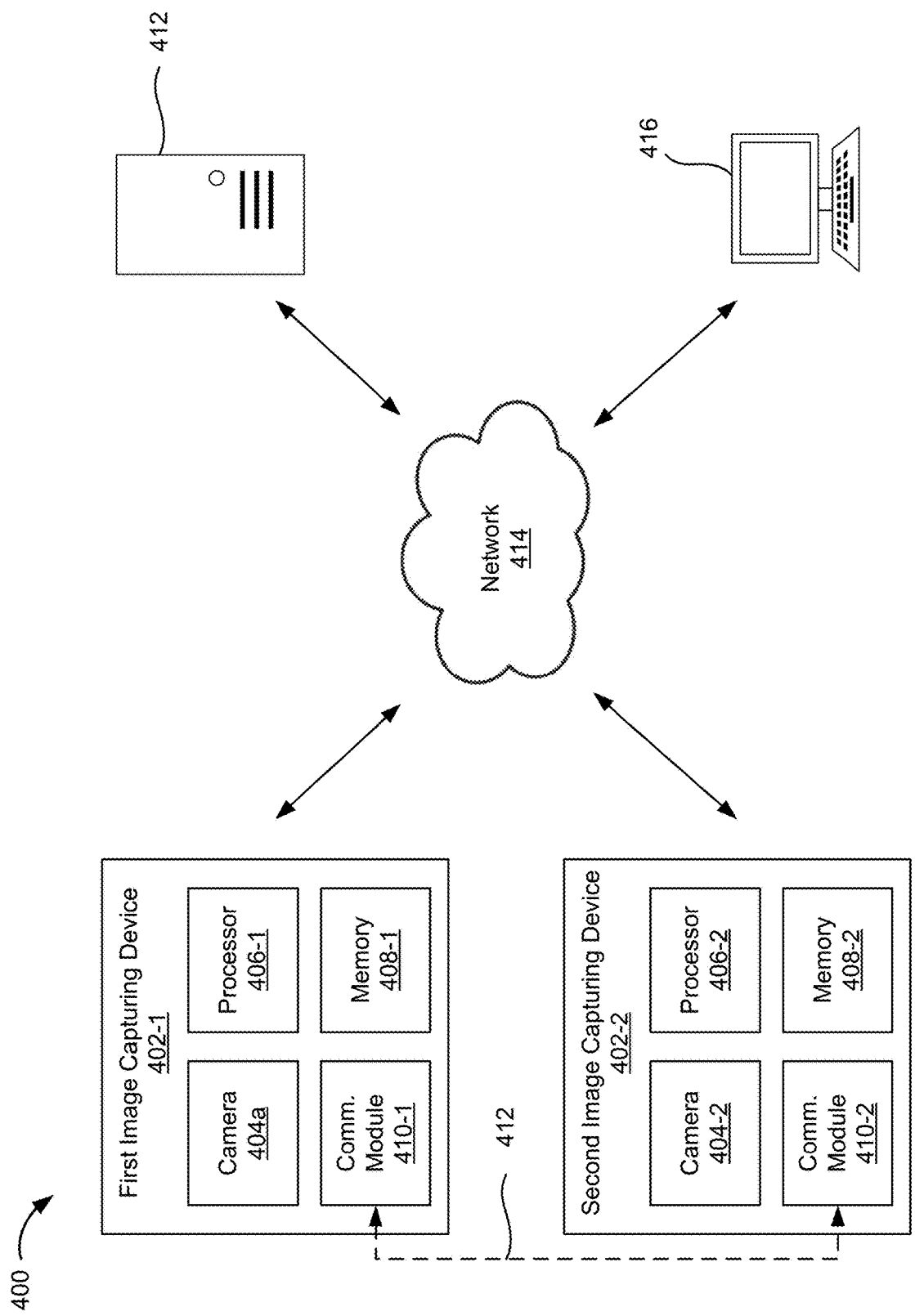
FIG. 4 is a simplified illustration of an example architecture of an image capturing system, according to some embodiments of the present disclosure.

FIG. 4 is a simplified illustration of an example architecture of an image capturing system 400, according to some embodiments of the present disclosure. Image capturing system 400 can include one or more image capturing devices 402, such as a first image capturing device 402-1 and a second image capturing device 402-2. Image capturing devices 402 may be removably fixed to mobile earthmoving machines, such as excavator 112 described above, and/or positioned at different locations at an earthmoving site. Each of the first and second image capturing devices 402 can include a camera 404, processor 406, and memory 408. Both camera 404 and memory 408 can be coupled to processor 406 so that processor 406 can control the operation of image capturing devices 402.

Camera 404 can be any suitable image capturing device for capturing images in red-green-blue (ROB) or monochrome format, such as a charge coupled device (CCD) camera. Processor 406 can be any suitable processor capable of executing instructions for controlling the operation of image capturing device 402, such as a microcontroller, application specific integrated circuit (ASIC), computer processing unit (CPU), field programmable logic array (FPGA), graphics processing unit (GPU), and the like. Memory 408 can include volatile and non-volatile memory for supporting the operation of processor 406, such as dynamic random-access memory (DRAM), read-only memory (ROM), a hard disk drive, and the like. Memory 408 can include instructions that, when executed, instruct processor 406 to perform the functions discussed herein, e.g., image capturing, image classification, object detection, action recognition, event recognition, and anomaly detection.

In some embodiments, each image capturing device 402 can also include a communication module 410 coupled to processor 406. Communication module 410 can be any suitable device capable of transmitting and receiving data from an external device. For instance, communication module 410 can be a wired communication module, such as a power-over-Ethernet (PoE) module or a wireless communication module, such as a wireless fidelity module (WiFi) module, Bluetooth module, cellular model, and the like. In certain embodiments, first image capturing device 402-1 can be communicatively coupled to second image capturing device 402-2 over a wired or wireless communication line 412. That way, data can be transferred between first and second image capturing devices 402, such as positional data.

Figure 5:
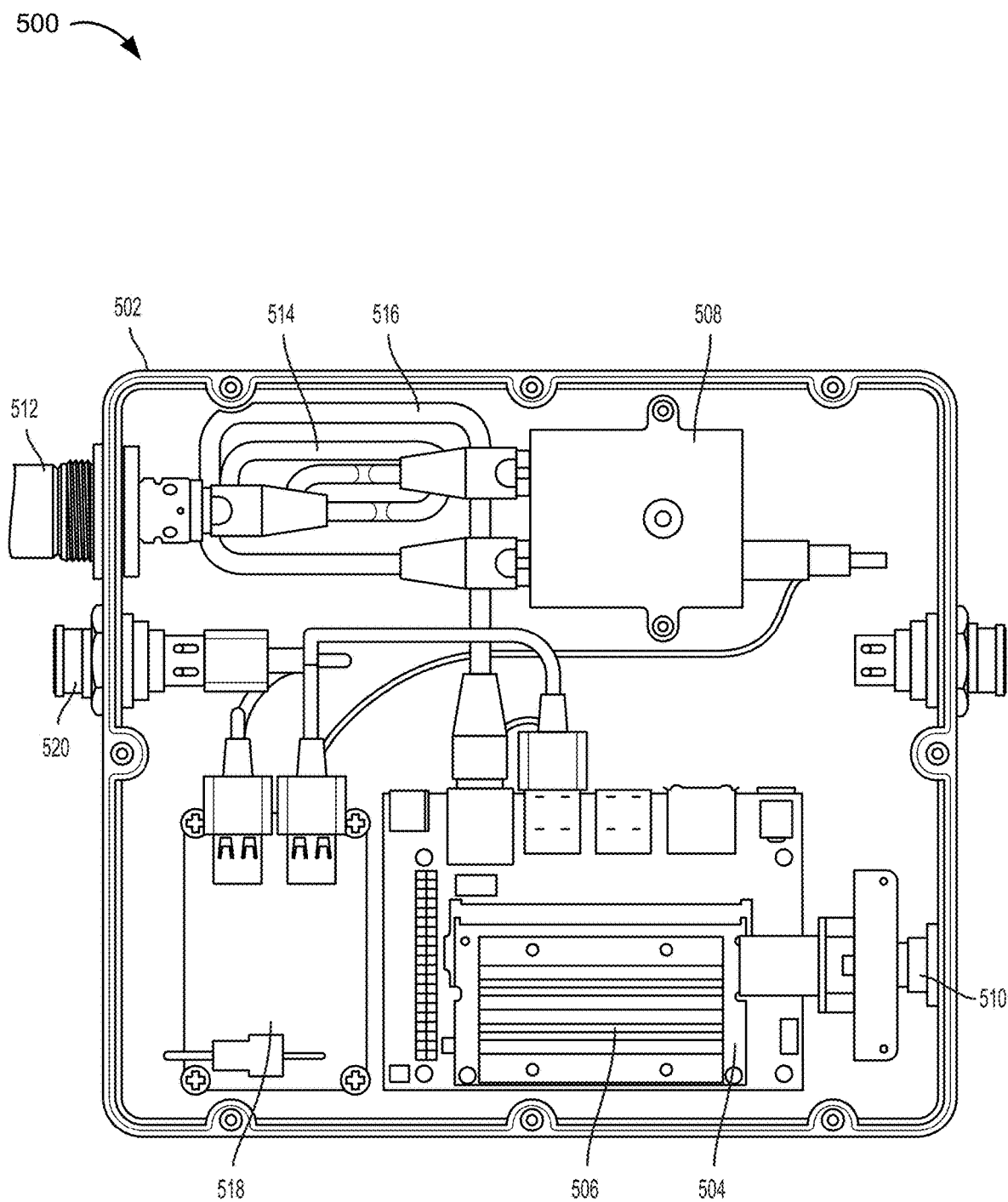
FIG. 5 is a top-down view of an example image capturing device, according to some embodiments of the present disclosure.

Image capturing device 402 can be a standalone unit that is positioned at an earthmoving site, as better shown in FIG. 5. FIG. 5 is a top-down view of an example image capturing device 500, according to some embodiments of the present disclosure. Image capturing device 500 can include a housing 502 that defines an inner cavity within which a processor 504, memory (not shown), camera 510, and a cooling component 506 mounted on processor 504 can be positioned. Image capturing device 500 can also include a communication module 508 coupled to processor 504 via a power and communication cable 516, e.g., twisted pair Ethernet cabling. Communication module 508 can be a PoE module that can pass direct current (DC) power along with data over Ethernet cabling to send power to processor 504 while also being able to send/receive data to/from processor 504. Communication module 508 can also send/receive data to/from an external device by way of an external communication port 512 via a communication cable 514 (e.g., Ethernet cabling). In some embodiments, image capturing device 500 can also include a power port 520 for receiving external power, and a power converter 518 for converting the received power to a higher or lower voltage level. The converted power can then be received by communication module 508 and relayed to processor 504 via power and communication cable 516. Data from processor 504, such as digital data representing captured images, can be sent to an external device by way of power and communication line 516, communication module 508, communication cable 514, and finally external communication port 512. The external device can be a remote server, a communication device that sends the digital data to a remote server over a wired or wireless network, or another image capturing device.

With reference back to FIG. 4, first and second image capturing devices 402 can be coupled to a remote server 412 over a communication network 414. In some embodiments, communication network 414 is a wired communication network or a wireless communication network, such as a cellular network (e.g., Global System for Mobile Communications (GSM) or Personal Communications service (PCS)), wireless local area networks (WLANs), and any other suitable wireless network. Remote server 412 can be computer a program or device located away from the earthmoving site that is dedicated to performing computations. In some embodiments, remote server 412 can be configured to receive captured images from devices 402 to verify image classification, object detection, and action recognition and/or perform event recognition and anomaly detection, as discussed herein. Remote server 412 can also provide a database within which data from devices 402 and data generated by remote server 412 can be stored for later processing.

In some embodiments, image capturing system 400 can further include a user terminal 416 coupled to remote server 412 and image capturing devices 402 over wireless network 414. User terminal 416 can access remote server 412 and image capturing devices 402 to access data to display to a user or perform further calculations. For instance, images captured at the earthmoving site by devices 402 can be replayed to the user, and/or processed data stored in remote server 412 (e.g., heavy equipment classifications, surface material classifications, attachment type classifications, action type classifications, and the like) can be displayed to the user or analyzed verification and/or project management and planning purposes. User terminal 416 can be any suitable user interface, such as a desktop computer, smart phone, laptop, tablet, and the like.

IV. Operational Configuration of the Image Capturing System

Figure 6:
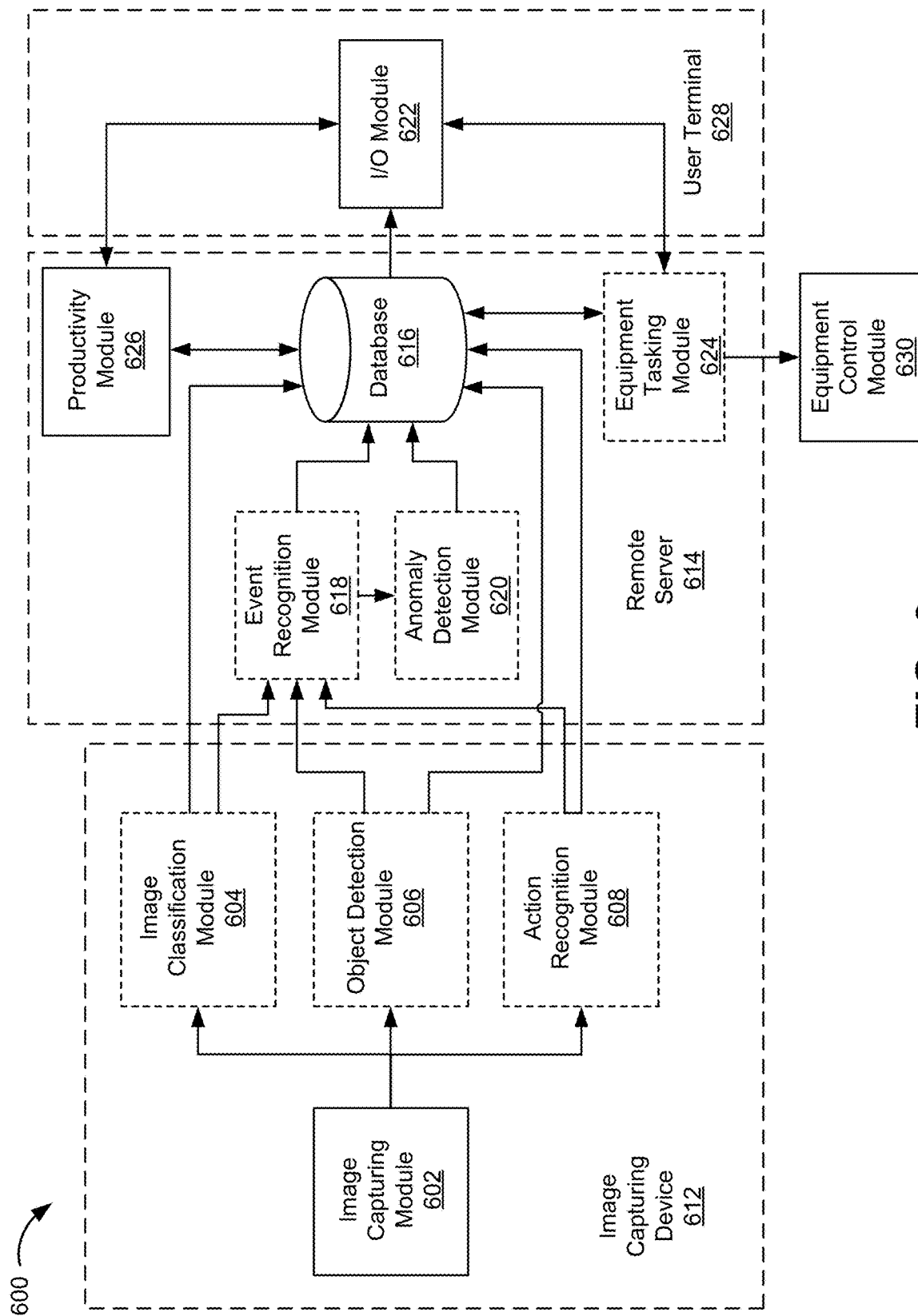
FIG. 6 is a simplified illustration of an example operational configuration of an image capturing system, according to some embodiments of the present disclosure.

FIG. 6 is a simplified illustration of an example operational configuration of an image capturing system 600, according to some embodiments of the present disclosure. FIG. 6 illustrates various functional modules and how each of them interact with one another to perform the various functions discussed herein for productivity capture. The functional modules can be implemented in hardware, software, or a combination of both hardware and software, including one or more signal processing and/or application specific integrated circuits.

As shown in FIG. 6, an image capturing module 602 that can generate/receive digital data from an image sensor, e.g., a CCD sensor, which is exposed to a scene at an earthmoving site. The digital data can represent a captured image, or stream of images, with a field of view overlapping with a working range of an attachment coupled to a mobile earthmoving machine. The image, or stream of images, can be put into an image classification module 604, object detection module 606, and action recognition module 608. Image classification module 604 can perform image classification on digital data corresponding to an image received from image capturing module 602 to identify types of heavy equipment, attachment types, surface material types, personnel, and the like, as discussed herein with respect to FIG. 2. Object detection module 606 can perform object detection on digital data corresponding to an image received from image capturing module 602 to identify a pixel location of an object in the captured image and generate or define a boundary around the object in the captured image, as further discussed with respect to FIG. 2. Action recognition module 608 can perform action classification on digital data corresponding to a stream of images received from image capturing module 602 to identify an action being performed by a mobile earthmoving machine, as discussed herein with respect to FIG. 3.

In some embodiments, image classification module 604, object detection module 606, and/or action recognition module 608 use a trained algorithm, such as an artificial intelligence/machine learning (AI/ML) model, to generate probabilities that the image, or a sequence of images, depict an object type or action type. The AI/ML models may be trained using one or a combination of supervised learning, unsupervised learning, semi-supervised learning and the like from previous images, or streams of images, previously captured at an earthmoving site from an image capturing device removable fixed to a mobile earthmoving machine. The previously captured images, or streams of images, may be associated with labels indicating the objects and/or actions depicted therein. The labels may be generated by additional AI/ML models and/or by human interaction to manually apply labels and/or verify the machine generated labels.

In some embodiments, image capturing module 602, image classification module 604, object detection module 606, and action recognition module 608 are implemented by an image capturing device 612 removably fixed to a mobile earthmoving machine, as described above in reference to FIG. 1. Image classification module 604, object detection module 606, and action recognition module 608 can optionally be implemented in a remote server 614 instead of, or in addition to, in image capturing device 612. This optionality is represented by the short dashed lines shown in FIG. 6.

Data generated by image classification module 604, object detection module 606, and action recognition module 608 can be sent to database 616 for storage, as well as to an event recognition module 618 for performing event recognition as discussed herein in Section II(D). Output from event recognition module 618 can be received by an anomaly detection module 620 for performing anomaly detection as also discussed herein in Section II(D). Additionally, or alternatively, anomaly detection module 620 may receive data directly from image classification module 604, object detection module 606, and action recognition module 608. Data generated by event recognition module 618 and/or anomaly detection module 620 can also be stored in database 616. In some embodiments, event recognition module 618, anomaly detection module 620, and database 616 are implemented in remote server 614. Optionally, as indicated by the short dashed lines in FIG. 6, event recognition module 618 and/or anomaly detection module 620 can be implemented in image capturing device 612 when device 612.

Image classification module 604 can output JSON data (or data in a similarly lightweight format) representing heavy equipment types, material types, attachment types, and the like identified in images captured at the earthmoving site. Object detection module 606 can also output JSON data (or data in a similarly lightweight format) representing positions and boundaries of objects identified in images captured at the earthmoving site. Action recognition module 608 can output JSON data (or data in a similarly lightweight format) representing an action type classification determined to have been performed by a mobile earthmoving machine from a sequence of images captured during a period of time. In some embodiments, the data from each of image classification module 604, object detection module 606, and action recognition module 608 may be combined in a single data structure. The data structure may represent a time interval with fields indicating: the starting time for the time interval, one or more image and/or frame identifiers captured during the time interval, one or more action type classifications and associated probabilities generated during the time interval, one or more object classifications and associated probabilities generated during the time interval and the image identifiers from which the object classifications were made, and the like.

In addition to JSON data (or data in a similarly lightweight format), image capturing device 612 may selectively transmit digital data representing captured images from image capturing module 602 in response to one or more conditions being met, as discussed further above. As can be appreciated herein, a majority of data sent from image capturing device 612 to remote server 614 over the wireless network has a small file size (e.g., JSON data/text data), while only a small amount of data is in a large file size (e.g., digital data representing captured images). Thus, the amount of data transmitted over the network can be small, thereby resulting in a more efficient and faster image capturing system, while also resulting in lower data transmission cost.

In some embodiments, image capturing system 600 can also include productivity module 626. Productivity module 626 can access data stored in database 616 for determining the state of ongoing activities relative to a project plan for the earthmoving site. Productivity module 626 may use data outputted by any of modules 604, 606, 608, 618, and 620, to evaluate productivity of the earthmoving site. For instance productivity module 626 can determine that an excavator has scooped and poured dirt into a dump truck 40 times (based on data from image classification module 604, action recognition module 608, and event recognition module 618), which resulted in 5 full dump truck loads that drove away (based on data from object detection module 606) and a total of approximately 1000 cubic feet of ground removal (based on data from action recognition module 608 and/or event recognition module 618). In another instance, productivity module can determine that additional dump trucks would reduce time spent idling by an excavator in between filling dump trucks (based on data from image classification module 604, object detection module 606, and/or action recognition module 608). This productivity data can be stored in database 616 for record keeping and later retrieval. As can be appreciated herein, the plethora of data generated by the different modules in the image capturing system can be used in various ways to improve a monitoring and management system's efficiency, speed, and accuracy with tracking productivity of heavy equipment at an earthmoving site.

In some embodiments, image capturing system 600 can also include equipment tasking module 624. As illustrated by the dashed lines, equipment tasking module 624 may be implemented on either or all of image capturing device 612, remote server 614, and/or user terminal 628. Equipment tasking module 626 can transmit information and commands to one or more equipment control modules 630. Information transmitted by equipment tasking module 626 may include indications of anomalies detected by anomaly detection module 620. For example, in response to detecting personnel in a dangerous location (e.g., within close proximity to an excavator determined to be performing a particular action), equipment tasking module 624 may transmit a warning signal to the excavator for display by equipment control module 630. Additionally, or alternatively, equipment tasking module 626 may transmit activity tasking information generated in response to output from productivity module 626, such as modified equipment tasking to improve productivity at the earthmoving site.

In some embodiments, equipment control module 630 includes an operator control interface configured to receive and display tasking information to an operator of heavy equipment. For example, equipment control module 630 may include one or more task descriptions including instructions for performing the actions and/or events that are scheduled to be performed by the associated heavy equipment. Equipment control module 630 may include a mobile device, such as a smart phone, tablet, or other mobile device in communication with image capturing device 612, remote server 614, and/or user terminal 628.

In some embodiments, equipment control module 630 is part of an autonomous or semi-autonomous equipment control system. For example, equipment control module 630 may be configured to transmit control signals to one or more physical components of heavy equipment (e.g., an excavator arm/attachment control system, a steering system, an engine, a transmission, and the like) to control the physical movement of the heavy equipment. The control signals may be received by equipment control module 630 from equipment tasking module 624. Using the above example related to detecting personnel in a dangerous location, equipment control module 630 may receive the warning signal from equipment tasking module 624 and automatically stop all movement by the excavator until the personnel is no longer detected in the dangerous location In some embodiments, image capturing system 600 can also include an input/output (I/O) module 622 implemented in a user terminal 628. I/O module 622 can be any suitable user interface for outputting information to a user and for receiving input from the user. For instance, I/O module 622 can include a display, touchscreen display, keyboard, mouse, trackpad, and the like. I/O module 622 can display any of the data stored in database 616. For example, as described above in further reference to FIG. 2, I/O module 622 may access images and/or streams of images captured by one or more image capturing devices, such as image capturing device 612, as well as the object and/or action classifications associated with the images, and display them to a user.

Additionally, or alternatively, I/O module 622 may receive data from productivity module 626 indicating productivity at the earthmoving site and/or the overall status of planned activities for the earthmoving site. I/O module 622 may further receive input from a user to modify what and how the information is displayed and/or to take follow-up actions in response to analysis generated by productivity module 626. For example, in response to receiving an updated status for the ongoing activities at an earthmoving site, I/O module 622 may receive one or more inputs adjusting heavy equipment tasking at the earthmoving site to improve productivity. The adjusted tasking may then be received by equipment tasking module 624 and transmitted to the corresponding equipment control module 630 for effectuation of the modified tasking.

It is to be appreciated that while FIG. 6 discusses what modules are implemented in which devices, embodiments are not so strictly limited. One skilled in the art can mix and match modules with devices in any embodiment, while still achieving the functionality discussed herein.

V. Method of Operating the Image Capturing System

Figure 7:
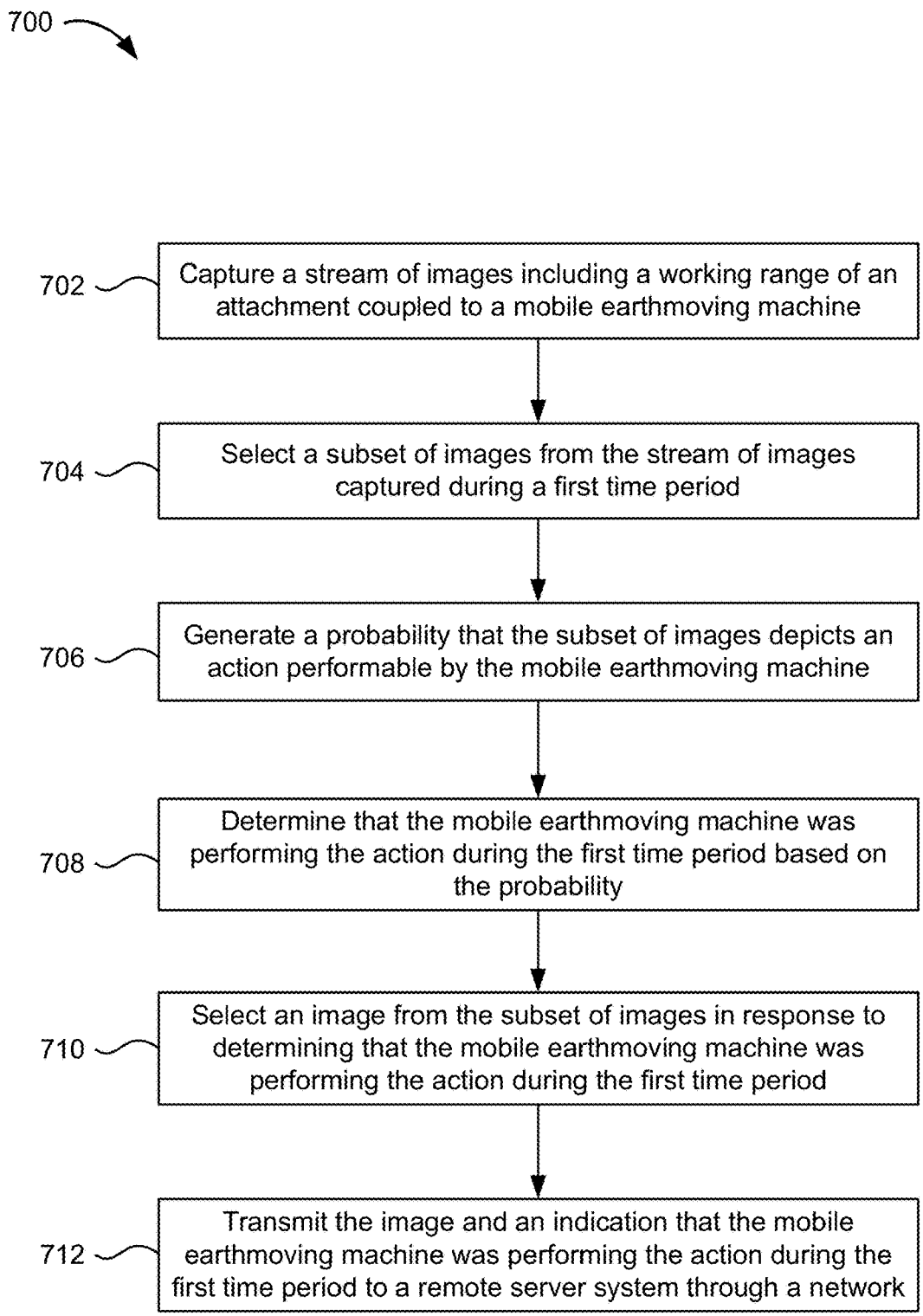
FIG. 7 is a simplified illustration of a method of operating an image capturing system, according to some embodiments of the present disclosure.

FIG. 7 is a simplified illustration of a method 700 of operating an image capturing system, according to some embodiments of the present disclosure. At block 702, a stream of images including a working range of an attachment coupled to a mobile earthmoving machine are captured. The stream of images may be captured by an image capturing device removably fixed to the mobile earthmoving machine. The field of view of the image capturing device may overlap with the working range of the attachment such that the stream of images includes the working range of the attachment. The stream of images can be recorded as digital data by a processor in the image capturing device. An example stream of images is shown in FIG. 3 and described further above.

At block 704, a subset of images captured during a first time period are selected from the stream of images. The first time period may correspond with a length of time during which the mobile earthmoving machine may perform part of an action using the attachment. In some embodiments, the beginning of first time period corresponds with an end of a preceding time period. The subset of images may be selected based on the input parameters for a trained classification algorithm as further described in relation to FIG. 3. For example, the subset of images may represent a down-sampling from the available images capturing during the first time period by the image capturing device.

At block 706, a probability that the subset of images depicts an action performable by the mobile earthmoving machine is generated. The probability may be generated by an algorithm existing in the memory of the image capturing device using the subset of images. The algorithm may be a machine learning algorithm, such as a neural network, random forest model, support vector machine, k-nearest neighbors algorithm, symbolic regression formula, and the like, trained to classify actions performable by one or more types of mobile earthmoving machines, such as excavators, dump trucks, bulldozers, and the like using sequences of images.

In some embodiments, the trained algorithm generates multiple probabilities associated with each of a plurality of actions performable by the mobile earthmoving machine. For example, in the case of an excavator, the trained algorithm may generate probabilities for a scooping type action, a pouring/loading type action, a rotating type action, and idle type action, and the like. In some instances, the trained algorithm may further generate a probability that the mobile earthmoving machine is performing an undefined or other activity not defined for the algorithm. While described as a probability, the trained algorithm may additionally, or alternatively, output another type of indicator for the likelihood that the subset of images depicts the mobile earthmoving machine performing a particular action, such as a letter grade, a binary determination, and the like.

At block 708, it is determined that the mobile earthmoving machine was performing the action during the first time period. The image capturing device may determine that the mobile earthmoving machine was performing the action based on the probability generated by the trained algorithm. For example, the image capturing device may determine that the probability exceeds a threshold probability value. Additionally, or alternatively, the image capturing device may compare the probability with other probabilities associated with each of the plurality of performable actions and determine that the probability associated with the action exceeds each of the other probabilities. In some embodiments, the image capturing device may use additional information to verify that the mobile earthmoving machine was performing the action during the first time period. For example, the image capturing device may verify that an excavator was loading/pouring material based on a determination from an image classification module that one of the images in the subset of images includes a dump truck. As another example, the image capturing device may verify that an excavator was scooping material based on a determination that one of the images in the subset of images depicts an excavator bucket coupled to the excavator. In some embodiments, the image capturing device may determine that the mobile earthmoving machine was performing the action for a longer period of time including the first time period based on similar probabilities from consecutive time periods during the longer period of time.

At block 710, an image from the subset of images is selected by the image capturing device. The image may be selected in response to determining that the mobile earthmoving machine was performing the action during the first time period. For example, based on a determination that the mobile earthmoving machine was performing an action of interest, such as loading/pouring material into a dump truck, an image from the subset of images may be selected. In some embodiments, the image may be selected based on its relative importance on generating the probability that the subset of images depicts the action. For example, the image may be selected based on its depiction of material falling from an excavator bucket into a waiting dump truck. In some embodiments, the image is used for additional processing, such as image classification, object detection, anomaly detection, and the like. For example, the detected action may act as a trigger to perform subsequent processing by the image capturing device on one or more images from the subset of images, as described further above.

At block 712, the image and an indication that the mobile earthmoving machine was performing the action during the first time period are transmitted to a remote server system. The image and the indication may be transmitted to the remote server system by the image capturing device through a network, such as a local area network (LAN) or wide area network (WAN). In some embodiments, the image capturing device uses Wi-Fi, cellular, Bluetooth®, mesh networking, or the like to transmit the image and the indication.

In some embodiments, the image is transmitted to the remote server system for verification purposes. For example, an operator may evaluate the image to verify that the image depicts the action determined by the image capturing device from the probability generated by the trained algorithm. Additionally, or alternatively, the image may be transmitted to the remote server system in order to continue training and improving the trained algorithm. For example, the trained algorithm may be updated in response to receiving a new action type classification for the image.

In some embodiments, the image is transmitted to the remote server system as an alternative to transmitting the entire subset of images and/or more images from the stream of images. In this way, costs associated with data transmission may be greatly reduced. Further, the indication that the mobile earthmoving machine was performing the action during the first time period may be transmitted as JSON data (or data in a similarly lightweight format) indicating the source of the data (e.g., the image capturing device and/or the mobile earthmoving machine to which the image capturing device is removably fixed), the time period for which it was determined that the particular action was being performed, and the like.

In some embodiments, the indication may be accompanied by additional information detected in the subset of images by the image capturing device. For example, in response to classifying one or more objects in the image, or one or more other images from the stream of images during the first time period, a second indication that the one or more objects were classified during the first time period may be transmitted to the remote server system. The one or more objects classified in the images may include types of heavy equipment (e.g., dump trucks, bulldozers, rollers, water trucks, other excavators, etc.), types of attachments coupled to the mobile earthmoving machine (e.g., buckets of various sizes, drills, breakers, claws, etc.), surface material types being acted upon by the mobile earthmoving machine (e.g., dirt, sand, rock, etc.), personnel, physical structures, and the like.

The indications transmitted by the image capturing device may be further analyzed to provide additional information related to monitoring and managing ongoing activities and events at the earthmoving site. For example, as described above, actions may be monitored to detect completion of various events schedule for completion by the mobile earthmoving machine at the earthmoving site, such as loading a dump truck, removing a certain amount of surface material from a particular location, transporting material from one location to another, and the like. As another example, anomalies associated with one or more objects and/or actions detected in the stream of images may be analyzed to detected and used to modify an operation of the mobile earthmoving machine.

Although the invention has been described with respect to specific embodiments, it will be appreciated that the invention is intended to cover all modifications and equivalents within the scope of the following claims.

What is claimed is:

1. A method for orchestrating activities at an earthmoving site, the method comprising:
    capturing, by an image capturing device removably fixed to a mobile earthmoving machine, a stream of images recorded as captured digital data, wherein a field of view of the image capturing device overlaps with a working range of an attachment coupled to the mobile earthmoving machine;
    selecting, by the image capturing device, a first subset of images from the stream of images captured during a first time period;
    generating, by a first trained algorithm existing in a memory of the image capturing device, and using the first subset of images, a probability that the first subset of images depicts a first action of a plurality of actions performable by the mobile earthmoving machine;
    determining, by the image capturing device based on the probability, that the mobile earthmoving machine was performing the first action during the first time period;

selecting, by the image capturing device, and in response to determining that the mobile earthmoving machine was performing the first action during the first time period, an image from the first subset of images; and transmitting, by the image capturing device, the image and a first indication that the mobile earthmoving machine was performing the first action during the first time period to a remote server system through a network.

2. The method of claim 1, further comprising:

identifying, by the image capturing device, an object within a first image of the first subset of images;

classifying, by the image capturing device, the object as a first object type; and transmitting, by the image capturing device, and in response to classifying the object as the first object type, a second indication that the object was detected during the first time period to the remote server system through the network.

3. The method of claim 2, wherein classifying the object comprises executing, using the first image, a second algorithm existing in the memory of the image capturing device trained to classify heavy equipment types, and the method further comprises:

determining a distance between the mobile earthmoving machine and the object based on positions of pixels of the object in the first image;

determining, based on the distance and the first action, that the first action is being performed on the object; and wherein transmitting the second indication to the remote server is in further response to the determination that the first action is being performed on the object, and includes the first image.

4. The method of claim 2, wherein classifying the object as the first object type comprises executing, using the first image, a second algorithm existing in the memory of the image capturing device trained to classify an attachment type of the attachment coupled to the mobile earthmoving machine.

5. The method of claim 2, wherein classifying the object as the first object type comprises executing, using the first image, a second algorithm existing in the memory of the image capturing device trained to classify a material type moveable by the attachment coupled to the mobile earthmoving machine.

6. The method of claim 2, further comprising:

detecting, based on the determination that the mobile earthmoving machine was performing the first action and the classification of the object as the first object type, an anomaly associated with the object, the first action, or both; and modifying, in response to detecting the anomaly, an operation of the mobile earthmoving machine.

7. The method of claim 6, wherein:

detecting the anomaly comprises determining that an action plan for the mobile earthmoving machine does not include the first object type; and modifying the operation of the mobile earthmoving machine comprises producing a warning signal at a user control interface of the mobile earthmoving machine.

8. The method of claim 1, further comprising:

detecting, from a plurality of subsets of images from the stream of images captured during a plurality of time periods including the first time period, a plurality of actions performed by the mobile earthmoving machine;

determining, from the plurality of actions performed by the mobile earthmoving machine, a status of an event to be completed by the mobile earthmoving machine at the earthmoving site; and generating a report at a user interface indicating the status of the event.

9. The method of claim 8, further comprising:

tasking, in response to determining the status of the event, a second mobile earthmoving machine to help complete the event.

10. The method of claim 1, wherein the plurality of actions performable by the mobile earthmoving machine includes at least one of: a scooping action, a rotating action, a loading action, and an undesignated action.

11. A system for orchestrating activities at an earthmoving site, the system comprising:

an image capturing device, wherein the image capturing device is removably fixable to a mobile earthmoving machine and includes:

a camera for capturing images of a region of the earthmoving site;

communication circuitry operable to transmit data to a remote server;

memory for storing at least a portion of the captured images of the earthmoving site; and a processor communicatively coupled to the memory, the camera, and the communication circuitry, wherein the processor is capable of executing instructions in the memory to:

capture, while the image capturing device is removably fixed to the mobile earthmoving machine, a stream of images recorded as captured digital data, wherein a field of view of the camera overlaps with a working range of an attachment coupled to the mobile earthmoving machine;

select a first subset of images from the stream of images captured during a first time period;

generate, by a first trained algorithm existing in the memory, and using the first subset of images, a probability that the first subset of images depicts a first action of a plurality of actions performable by the mobile earthmoving machine;

determine, based on the probability, that the mobile earthmoving machine was performing the first action during the first time period;

select, in response to the determination that the mobile earthmoving machine was performing the first action during the first time period, an image from the first subset of images; and transmit, by the communication circuitry, the image and a first indication that the mobile earthmoving machine was performing the first action during the first time period to a remote server through a network.

12. The system of claim 11, wherein the processor is further capable of executing instructions in the memory to:

identify an object within a first image of the first subset of images;

classify the object as a first object type; and transmit, in response to classifying the object as the first object type, a second indication that the object was detected during the first time period to the remote server through the network.

13. The system of claim 12, further comprising a remote server system including the remote server and being configured to:

receive the first indication that the mobile earthmoving machine was performing the first action and the second indication that the object was detected; and detect, based on the first indication and the second indication, an anomaly associated with the object, the first action, or both; and transmit, in response to detecting the anomaly, a third indication of the anomaly to the mobile earthmoving machine through the network.

14. The system of claim 13, further comprising a display device configured to present the third indication to an operator of the mobile earthmoving machine in response to receiving the third indication from the remote server system.

15. The system of claim 13, further comprising an autonomous control device configured to control an operation of the mobile earthmoving machine and, in response to receiving the third indication from the remote server system, stop the mobile earthmoving machine from performing the first action.

16. One or more non-transitory computer-readable storage media storing instructions that, upon execution by one or more processors of an image capturing device removably fixed to a mobile earthmoving machine, cause the one or more processors to perform operations including:

capturing, a stream of images recorded as digital data by the image capturing device, wherein a field of view captured in the stream of images overlaps with a working range of an attachment coupled to the mobile earthmoving machine;

selecting, a first subset of images from the stream of images captured during a first time period;

generating, by a first trained algorithm, and using the first subset of images, a probability that the first subset of images depicts a first action of a plurality of actions performable by the mobile earthmoving machine;

determining, based on the probability, that the mobile earthmoving machine was performing the first action during the first time period;

selecting, in response to determining that the mobile earthmoving machine was performing the first action during the first time period, an image from the first subset of images; and transmitting, the image and a first indication that the mobile earthmoving machine was performing the first action during the first time period to a remote server system through a network.

17. The one or more non-transitory computer-readable storage media of claim 16, wherein the operations further include:

identifying, an object within a first image of the first subset of images;

classifying, the object as a first object type; and transmitting, in response to classifying the object as the first object type, a second indication that the object was detected during the first time period to the remote server system through the network.

18. The one or more non-transitory computer-readable storage media of claim 17, wherein classifying the object comprises executing, using the first image, a second algorithm trained to classify heavy equipment types, and the operations further include:

determining a distance between the mobile earthmoving machine and the object based on positions of pixels of the object in the first image;

determining, based on the distance and the first action, that the first action is being performed on the object; and wherein transmitting the second indication to the remote server is in further response to the determination that the first action is being performed on the object, and includes the first image.

19. The one or more non-transitory computer-readable storage media of claim 17, wherein classifying the object as the first object type comprises executing, using the first image, a second algorithm trained to classify an attachment type of the attachment coupled to the mobile earthmoving machine.

20. The one or more non-transitory computer-readable storage media of claim 17, wherein classifying the object as the first object type comprises executing, using the first image, a second algorithm trained to classify a material type moveable by the attachment coupled to the mobile earthmoving machine.

* * * * *